R. BERNSTEIN.
AGRICULTURAL MACHINE.
APPLICATION FILED DEC. 14, 1916.

1,399,045.

Patented Dec. 6, 1921.

Rudolph Bernstein
Inventor by *[signature]*
Attorney

UNITED STATES PATENT OFFICE.

RUDOLF BERNSTEIN, OF HALLE-ON-THE-SAALE, GERMANY.

AGRICULTURAL MACHINE.

1,399,045.　　　　Specification of Letters Patent.　　Patented Dec. 6, 1921.

Application filed December 14, 1916. Serial No. 137,052.

(GRANTED UNDER THE PROVISIONS OF THE ACT OF MARCH 3, 1921, 41 STAT. L., 1313.)

*To all whom it may concern:*

Be it known that I, RUDOLF BERNSTEIN, a subject of the German Emperor, and resident of Halle-on-the-Saale, in the Kingdom of Prussia and Empire of Germany, have invented certain new and useful Improvements in Agricultural Machines, of which the following is a specification.

In automobile soil working or agricultural machines with two drive-wheels arranged on different sides heavy difficulties are frequently created by the so-called "oblique draft" caused by the fact that one of the said drive-wheels is located nearer to the center of the resistance-forces than the other. Owing to this fact it is rather difficult to drive the machine in a straight line, as it shows a tendency to turn toward that side where the center of the resistance-forces is located. This drawback which one has tried to get rid of by means of a great number of devices arises especially in motor plows having a great width of track, viz., a great distance between the drive-wheels, if such plows are designed for a small width of work only, or in other words, if they shall work only a narrow strip of land at each travel.

Now according to the present invention the above mentioned disadvantage is avoided by unsymmetrically distributing the driving power to the two drive-wheels in such a way that in driving the machine straight forward the wheel which is nearer to said center exerts a greater driving power than the other wheel. This can be effected for instance by constructing the differential gearing inserted between the driving motor and the drive-wheels unsymmetrically same as has been done for other purposes. The same effect can also be obtained by providing a separate driving motor for each of the two drive-wheels and by providing a stronger motor for that drive-wheel which is nearer to the center of the resistance-forces. This latter solution of the problem recommends itself quite especially for electric plows.

In the drawings accompanying this specification some preferred embodiments of the invention are shown, all of them being provided with an unsymmetric differential gearing.

Figure 1:
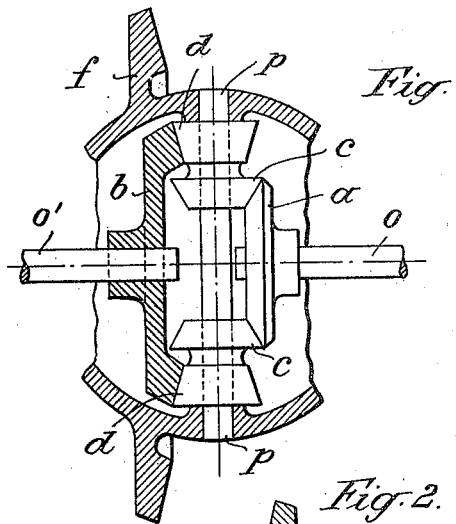
Figure 1 is a section through a differential gearing with bevel gears.
Figure 2:
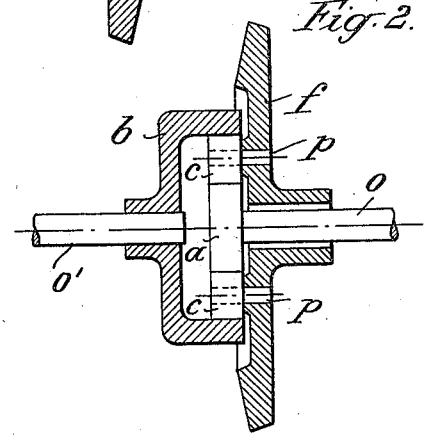
Fig. 2 is a section through a differential gearing with spur wheels.

According to Figs. 1 and 2 bevel gears $a$ and $b$ as in an ordinary differential gearing are keyed opposite each other on shafts $o$ and $o'$ in connection with the wheels (not shown). Two pairs of bevel gears $cd$, $cd$ are mounted, like the usual single bevel gear wheels, on the big drive gear $f$ by aid of journals $p$, $c$ gearing with $a$ and $d$ with $b$.

If the diameters of gears $c$ and $d$ forming one piece are equal, then the turning movements transmitted to the wheel shafts, when the gearing is in its state of equilibrium, that is in going straight forward, will be proportionate to the medium diameter of $a$ and $b$. Gears $c$ and $d$ might of course have different diameters. The only criterion is the difference in the ratios of gearing $a: b$ and $c: d$.

In the modification shown in Fig. 2 shaft $o$ carries a spur gear $a$, coaxial shaft $o'$ the internal tooth wheel $b$ entirely encircling gear $a$. The spur gears $c$ rotatably located on journals $p$ of the driving wheel $f$ and sharing its movement of rotation are in gear with both $a$ and $b$. The mechanism is in a state of equilibrium if, as above, the torques acting on $a$ and $b$ are proportionate to the pitch-circle diameters of these wheels.

Figure 3:
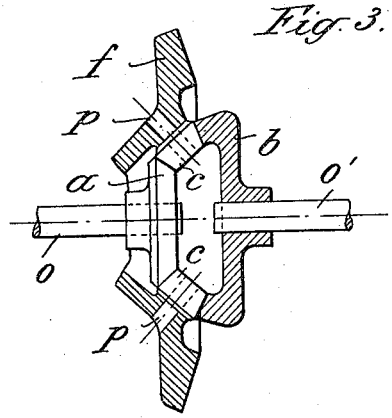
Fig. 3 is a section through another differential gearing with bevel gears.

In the modification shown in Fig. 3 the shaft $o$ carries the small bevel gear $a$ provided with external teeth, while shaft $o'$ carries the larger internal tooth bevel gear $b$. Both wheels are in gear with bevel wheels $c$ rotatably arranged on the driving wheel $f$. The state of equilibrium is obtained under the condition explained for modifications 1 and 2.

In all the modifications described which might as well be additioned by some more combinations of spur gear and bevel gear wheels provided with internal and external teeth the principal common feature is that the proportions of the number of teeth of the planetary intermediate gear wheels to the number of teeth of the gears carried by the shafts arranged opposite each other are not equal, but different, the torques transmitted to the side wheels being thus rendered unequal when the gearings are in a state of equilibrium.

One may say generally that for the present purpose the driving power in going straight forward is divided in two unequal parts same as is being done with the normal differential gearing in passing through a curve. Such mechanisms as are apt to effect this will be designed hereinafter as "unequal" mechanisms.

Figure 4:
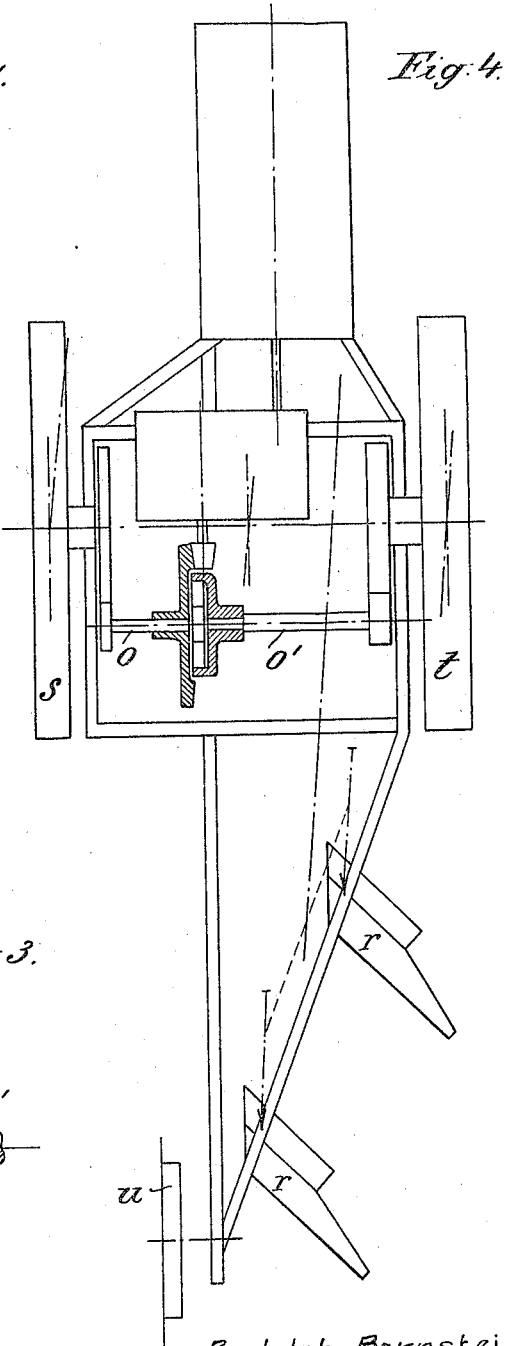
Fig. 4 is a diagrammatic plan view of a motor plow provided with a differential gearing according to Fig. 2.

In Fig. 4 a motor plow provided with a furrow drive wheel is shown diagrammatically as embodying the case where an unequal differential gear according to the present invention shall be applied. The plow as represented in the drawings is a supporting plow with a pair of plowshares and having a wheel track considerably exceeding the working track. The resultant S of the plow resistance passes the center O between the drive wheels s and t at a distance i, and, if the plow were provided with an ordinary symmetric differential, it would act upon the plow with a deflecting momentum i, S, the land-plates XXX of the plowshares as well as the rear governing wheel u receiving a side pressure resulting in a frictional loss and in some cases even in a giving way or yielding movement. By unequally dividing the work of the motor in accordance with the present invention the momentum mentioned above can be diminished or suppressed at will, complete suppression taking place in the case where the differential gear is constructed as shown for instance in Figs. 1 to 3 of the drawings so that the part of the motor work which is transmitted onto the furrow drive wheel t is to the part transmitted onto the wheel s as is k to l. To this end the diameters of spur gears b and a (Fig. 2) would have to be as k to l. The arrangement of the differential in a motor plow may for instance be made according to the usual disposition as shown in Fig. 4, the power being transmitted from the motor m through a change speed gear n (particulars not shown) to a bevel gear f and further through intermediate spur gears c at the one hand to the small spur gear a and from there through gear wheel g to the driving wheel s, on the other hand to the large spur gear b and from there through gear wheel h to the furrow drive wheel t. In a corresponding manner an arrangement of this sort may be applied to all other kinds of automobile motor plows whenever the resultant of the plow resistance does not pass through the middle between the two drive wheels.

With the unequal differential it is not only possible to suppress the momentum tending, under ordinary circumstances, to divert the machine toward the plowed ground. It is even possible to create an excess of force in the opposite sense so as to divert the machine to the unplowed side. This has proved to be advantageous in a case where the dirigible front truck of a dragging plow is traveling with one of the truck wheels in the furrow so as to provide an automatic steering, or in the case where a special wheel running in the furrow is fixed in front of the machine and is acting upon the front truck. In general such wheels in order to make them run close to the edge of the furrow so as to guide themselves in it, require being placed in a somewhat oblique position toward the unplowed land. This arrangement however is the cause of a certain loss of power and it may happen that the wheel climbs up the edge and leaves the furrow altogether. This oblique position of the wheel is rendered entirely superfluous by the unequal differential causing the plow resistance to divert the machine toward the unplowed land. In this case the steering wheel running in the furrow need only have an axle slightly inclined relatively to the horizontal, this position being obtained automatically in the case where the wheel belongs to a twin-wheeled front-truck.

The above used terms "unequal mechanism" or "unequal differential" are of course to be understood in their broadest sense and shall comprise every device which employing one or more differential gearings is adapted to distribute unequally the power of the driving motor to the two drive-wheels in driving straight forward.

I claim:

1. In an automobile agricultural machine, the combination with a soil working device of two driving wheels, arranged on either side of the machine and one of which is located nearer to the center of the resistance offered to the soil working device than the other, and means for unequally distributing the driving power to the driving wheels, so as to impart a greater driving force to the wheel, which is nearer to said center of resistance.

2. In an automobile agricultural machine, the combination with a soil working device of two driving wheels, arranged on either side of the machine and one of which is located nearer to the center of the resistance offered to the soil working device than the other, and mechanism, comprising a differential gearing, adapted to unequally distribute the driving power to the driving wheels, so as to impart a greater driving force to the wheel, which is nearer to said center of resistance.

3. In an automobile agricultural machine, the combination with a soil working device of two driving wheels, arranged on either side of the machine and one of which is located nearer to the center of the resistance offered to the soil working device than the other, and unsymmetric differential mechanism adapted to unequally distribute the driving power to the driving wheels, so as to impart a greater power to the wheel, which is nearer to said center of resistance.

Signed at Nuremberg in the Empire of Germany this — day of October A. D. 1916.

RUDOLF BERNSTEIN.

Witnesses:
 OSCAR BOCK,
 ILLONA SUESS.